United States Patent [19]

Auciello et al.

[11] Patent Number: 4,515,271

[45] Date of Patent: May 7, 1985

[54] INSERT MEANS FOR FORMING VOIDS IN CONCRETE AND METHOD OF APPLYING SAME

[75] Inventors: Michael J. Auciello, Haverhill; Anthony R. Auciello, Scituate, both of Mass.

[73] Assignee: Auciello Iron Works, Inc., Hudson, Mass.

[21] Appl. No.: 552,627

[22] Filed: Nov. 17, 1983

Related U.S. Application Data

[63] Continuation-in-part of Ser. No. 420,547, Sep. 20, 1982, abandoned.

[51] Int. Cl.³ ............... B65D 85/62; B65D 21/02; B28B 7/28
[52] U.S. Cl. .................. 206/519; 206/627; 249/175; 249/183; 264/542; 425/542; 52/704
[58] Field of Search ............ 206/216, 627, 519; 52/704; 249/175, 177, 183, 186

[56] References Cited

U.S. PATENT DOCUMENTS

| | | |
|---|---|---|
| 1,406,577 | 2/1922 | Murray . |
| 1,481,807 | 1/1924 | Murray . |
| 1,954,788 | 4/1934 | Chambliss, Jr. et al. . |
| 2,132,966 | 10/1938 | O'Brien .................. 206/627 |
| 2,639,873 | 5/1953 | Smith ..................... 242/172 |
| 3,020,615 | 2/1962 | Peters ..................... 249/175 |
| 3,205,634 | 9/1965 | Wagner ..................... 52/704 |
| 3,265,349 | 8/1966 | Hamrick .................. 249/183 |
| 3,346,230 | 10/1967 | Tolf, Jr. .................. 249/183 |
| 3,933,336 | 1/1976 | Tolf, Jr. .................. 206/519 |

OTHER PUBLICATIONS

Post Sleeves for Railings, R. & B. Wagner, Inc., Milwaukee, Wisconsin, 53207, Oct. 1981, p. 102.

*Primary Examiner*—William T. Dixson, Jr.
*Attorney, Agent, or Firm*—Hamilton, Brook, Smith & Reynolds

[57] ABSTRACT

Insert means for forming a void in poured concrete comprises a tubular structure formed of sheet material closed at upper and lower ends by means of an upper closure element and a lower closure element, respectively. The inner surface of the tubular structure presents a helical line of scoring extending between the bottom of the tubular structure and the upper closure element. The upper closure element is formed integrally with the tubular sheet material and constructed at an upper side thereof with holder tab means for handling the insert means and especially for lifting the upper closure element and the pulling away of the tubular structure along the line of scoring to leave a void. The tubular structure is characterized by a tapered configuration which decreases in size from the bottom to the top thereof. As a result of this tapered construction a plurality of the tubular inserts may be arranged in nested relationship and the holder tab means is operable to maintain upper closure elements of the nested inserts spaced away from one another.

6 Claims, 14 Drawing Figures

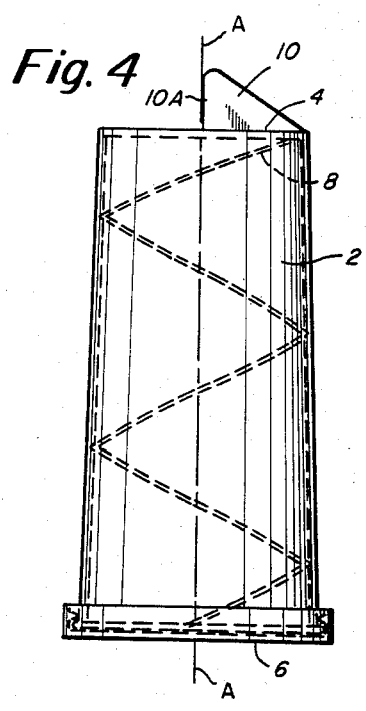
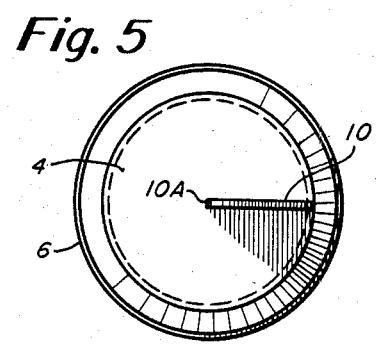
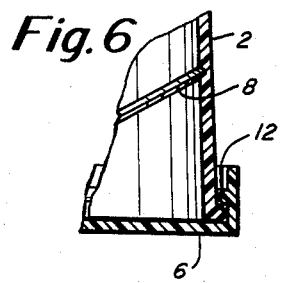
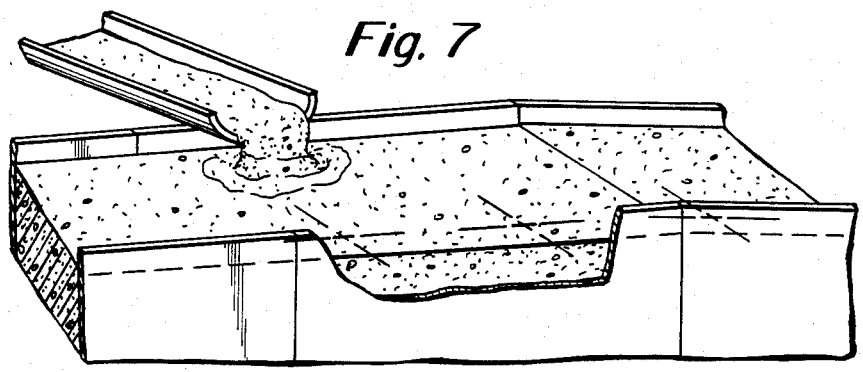
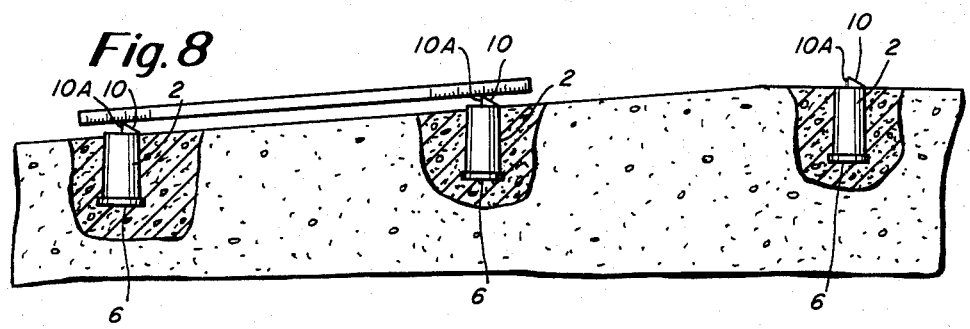

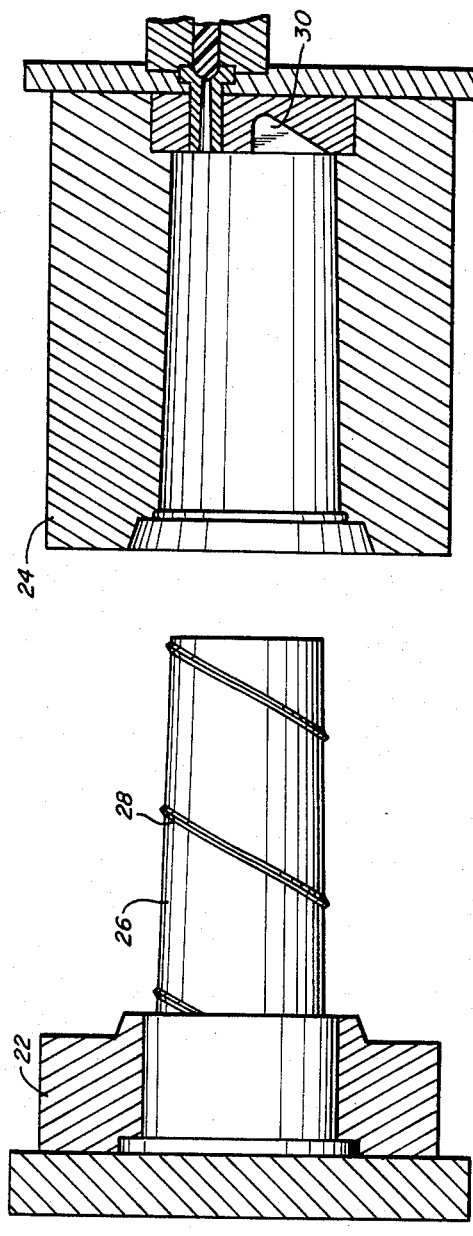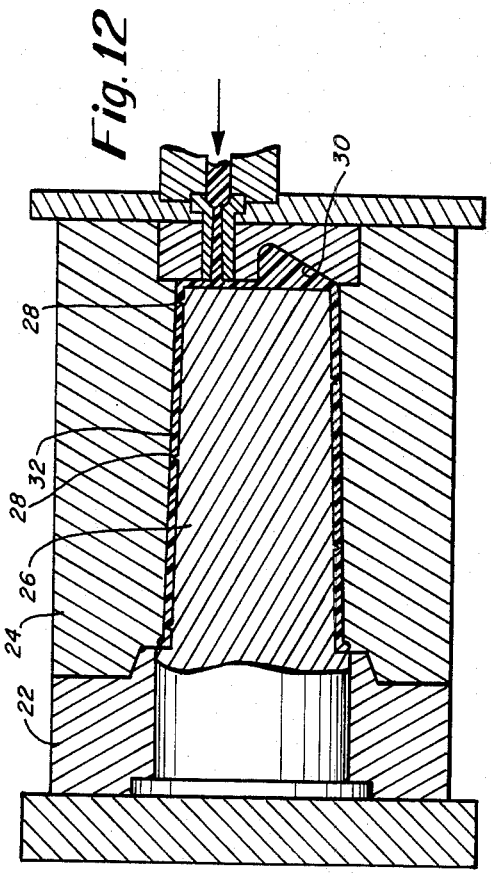

4,515,271

INSERT MEANS FOR FORMING VOIDS IN CONCRETE AND METHOD OF APPLYING SAME

This application is a continuation-in-part of application Ser. No. 420,547, filed Sept. 20, 1982, now abandoned, in the names of Michael J. Auciello and Anthony R. Auciello.

FIELD OF THE INVENTION

In constructing metal railings, fencing and the like in poured concrete it is customary to provide voids for embedding posts or other portions of the structural components in the poured concrete and solidly anchoring by introducing concrete or grout around the embedded parts.

It should be understood that the voids are not utilized until the concrete has hardened or cured to a desired state and therefore the voids may be exposed to rainfall and must be closed off by a water resistant material. Also there may occur an accumulation of particles of foreign matter which may interfere with proper grounding of a structural component in a void and it becomes necessary to remove such particles.

In providing voids a common practice is to resort to core drilling and such a procedure may be difficult to control accurately and is very costly. It has also been proposed to use metal sleeves which can, however, cause corrosion problems. Should the metal sleeve be set out of square alignment, as can easily occur, this prevents an embedded item from fitting into the void properly. Corrective action would be to chip away the concrete around the metal sleeve and then burn the sleeve out with a cutting torch.

Also, in laying out desired spacings to receive post members which may have been prefabricated precise measurements from center to center of voids may be difficult.

Because of these difficulties there exists a need for a better way of forming voids and the method and means of the invention is designed to provide such a better way, as well as improved measuring techniques.

SUMMARY OF THE INVENTION

The present invention relates to insert means for forming voids in formed concrete. More particularly. the invention is concerned with insert means which can be embedded in poured concrete and subsequently removed when the poured concrete has hardened, thus forming voids in which upright sections of a metal railing or fence may be received and secured.

It is a chief object of the invention to devise a tubular insert member which may be used in freshly poured concrete to form a void into which structural members may be received. Another object is to provide a tubular insert body of sheet material which may be formed by injection molding and which is characterized by an internally located line of scoring by means of which portions of the sheet material may be stripped away to form a void in the concrete.

A further object of the invention is to provide a tubular insert body which is of a tapered construction suitable for arranging a plurality of the inserts in nested relation.

Still another object is to devise a tubular insert which is characterized at its upper side by holder tab means by which the inserts may be placed in concrete and may, when the concrete is hardened, be stripped away to form a void.

BRIEF DESCRIPTION OF THE DRAWINGS

FIG. 4 is a side elevational view of the tubular insert means and illustrating in part the holder tab extending upwardly from the outer peripheral edge of the tubular insert member and terminating in a vertical centering adge which coincides with the central vertical axis of the tubular insert member.

FIG. 5 is a plan view of the structure shown in FIG. 4.

FIG. 6 is a fragmentary cross-sectional view of the tubular insert means showing in more detail a lower closure element secured around a retaining rib formed on the upper insert means.

FIG. 7 is a perspective view illustrating a step of pouring concrete into a form to provide a base for receiving metal railing means.

FIG. 8 is a schematic view illustrating a further step of embedding a number of the tubular insert means in poured cement of FIG. 7 and indicating the use of the holder tab centering edges to obtain a desired uniform spacing of the tubular insert means.

FIG. 11 is a view in cross-section illustrating injection molding components for forming the tubular insert means of the invention with the molding components occurring in spaced relationship.

FIG. 12 illustrates the molding component in a closed position and further indicates plastic material injected therein.

DETAILED DESCRIPTION OF THE INVENTION

The invention structure in general is concerned with tubular insert means for providing voids in which upright sections of a metal railing or fence may be secured in a concrete base such as may be employed for an outside balcony, porch or the like. In this arrangement the voids do not extend through the concrete base and are to be made of a size such that the bottom ends of the upright sections of the railing may fit loosely against a flat bottom surface and may be secured by a grouting when installed. It will be understood that the tubular insert means is required to be inserted in the concrete while it is in a plastic state and after having been inserted must be maintained in a weather resistant condition by suitable closure means. After the concrete is fully hardened the insert means is stripped away to leave a void of the required size.

Figure 1:
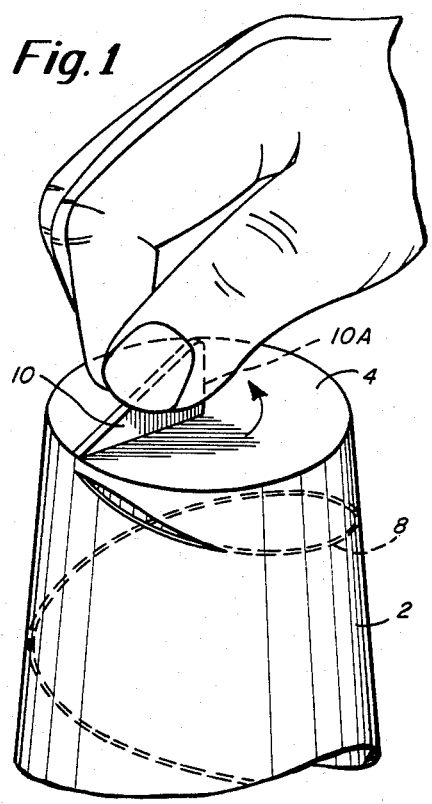
FIG. 1 is a fragmentary perspective view illustrating a portion of the tubular insert means of the invention and showing an upper closure element and holder tab in a position to be lifted and pulled away.
Figure 2:
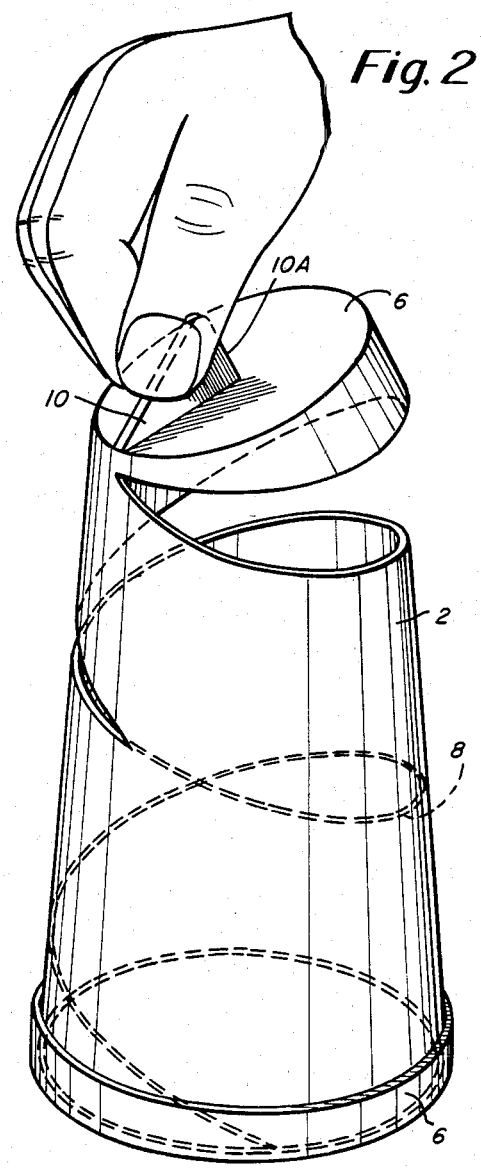
FIG. 2 is another perspective view similar to FIG. 1, but illustrating the upper closure element and holder tab having been lifted and pulled away to remove the tubular insert along a helical line of scoring which is located internally of the insert body.
Figure 3:
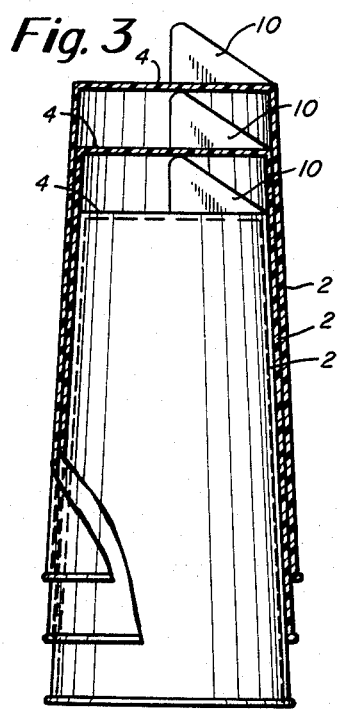
FIG. 3 is a vertical cross-sectional view illustrating a plurality of tubular inserts arranged in nested relationship with respective holder tabs locating upper closure elements spaced apart from one another.

Principal parts of the tubular insert means of the invention are shown in FIGS. 1–6, inclusive, and include two separately molded components. One of the molded components consist of a tapered tubular body 2 having an upper closure element 4 formed integrally therewith. The second molded component comprises a lower closure element 6. Customarily the tapered tubular inserts are produced in quantity and packaged in nested relationship, as illustrated in FIG. 3, to facilitate usage. Similarly, the bottom closure elements are separately formed and packaged and are attached to the bottoms of the upper inserts at the time they are embedded in concrete.

The tubular body in each instance is formed of some suitable material such as a thin plastic sheet material and is molded by means of molding die means, as hereinafter disclosed.

In accordance with the invention an inner surface of the upper insert body is formed with a vertical line of scoring 8 which extends between the bottom of the tubular insert and the upper closure member 4 and which is of a depth such that the upper closure element 4 may be lifted upwardly and portions of the tubular body stripped away, as suggested in FIGS. 1 and 2.

An important feature of the invention consists in constructing the upper closure element 4, at a top side thereof, with a holder tab 10. As shown in FIGS. 1–5, the holder tab comprises a relatively thin body which may be gripped between the thumb and finger, as indicated in FIGS. 1 and 2. The holder tab extends angularly upwardly from an outer edge of the element 4 and terminates in a vertical centering edge 10A which coincides with the central vertical axis AA of the tubular insert, as indicated diagrammatically in FIG. 4.

As shown in FIG. 8, the centering edges of a plurality of inserts provide a desirable means of laying out centers of openings which are to receive rail upright spacings of a predetermined nature.

Since the installation of metal rails, fencing or the like requires a plurality of uniformly spaced apart voids a number of the tubular insert means must be utilized to facilitate handling and use. Each of the tubular insert means is formed with a tapered configuration by means of which the inserts may be packaged and compactly stored in nested relationship, as has been indicated in FIG. 3.

Figures 9, 9A, 9B:
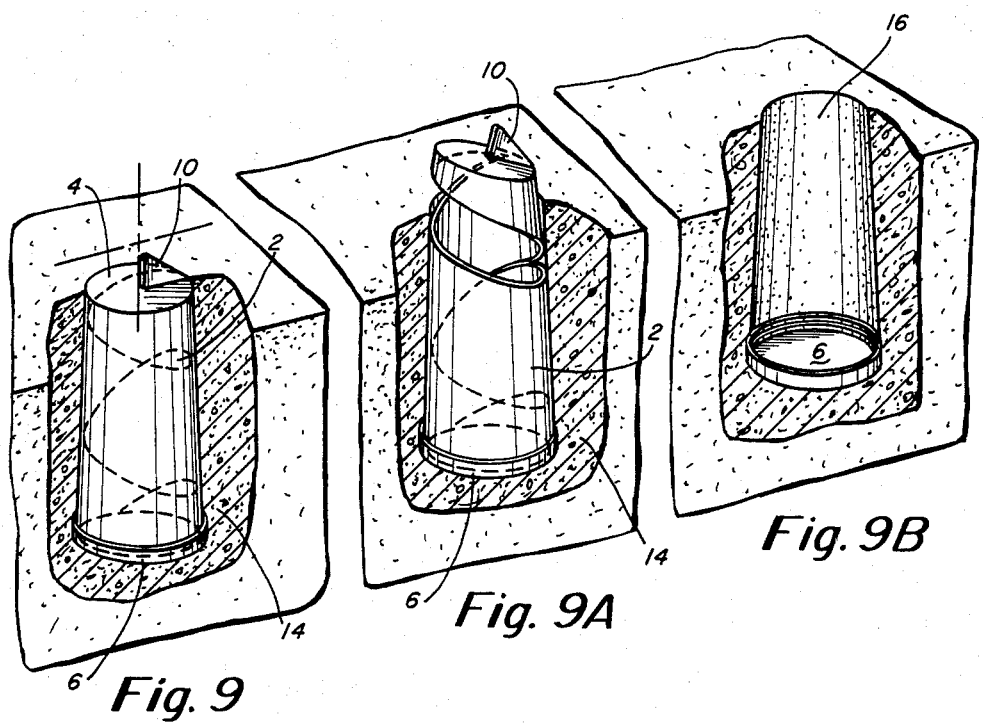
FIG. 9 is a fragmentary perspective view of a section of hardened concrete in which a tubular insert member has been embedded and is to be removed after the cement has hardened to form a void.
FIG. 9A is a view similar to FIG. 9 and further showing the upper closure element and holder tab lifted and portions of the tubular insert being pulled away along a line of scoring.
FIG. 9B is a view of the concrete section of FIGS. 9 and 9A, but indicating the tubular insert means completely removed to form a void.

At a lower end of the tubular insert body there is provided an annular rib 12 which is designed to engage in an annular channel in the bottom closure 6, as is most clearly shown in FIG. 6. In FIG. 9 the tubular insert 2, with the upper and lower closure means, is shown after being embedded in a body of cement 14 while in a plastic state and it is pointed out that the holder tab 10 may be employed to grip an insert member to facilitate handline and positioning the insert in plastic cement.

FIG. 9A illustrates the body of cement 14 after it has hardened and this Figure illustrates the holder tab 10 in a position to lift up the upper closure element and strip away the tubular body.

FIG. 9B illustrates the tubular insert entirely removed to form a void 16.

Figure 10:
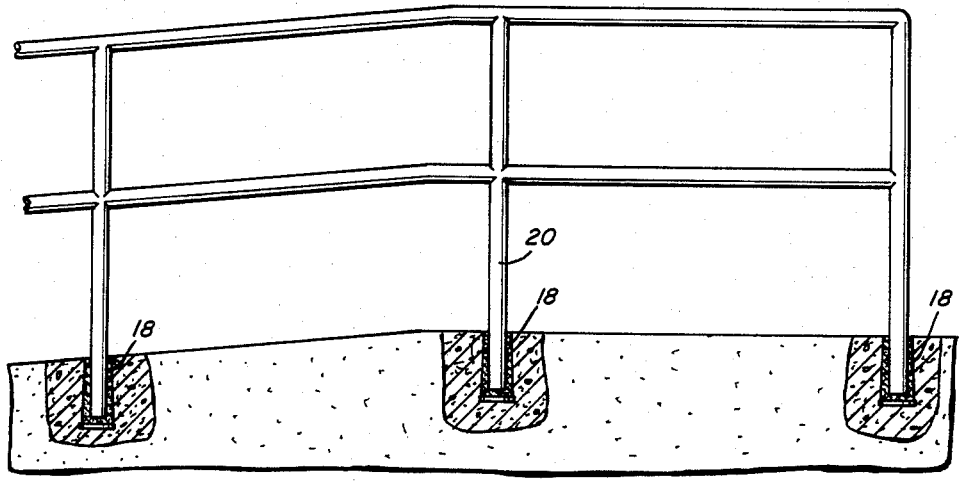
FIG. 10 is an elevational view of a railing with upright portions being located in voids in a concrete section in uniformly spaced relation and secured by a thin grouting.

FIG. 10 illustrates a series of uniformly spaced voids in which bottom ends of railing uprights 20 are received and secured by means of grouting 18, as shown in FIG. 10.

As one suitable means of forming the tapered tubular insert construction of the invention there has been devised an injection molding apparatus which is illustrated in FIG. 11 and which includes a male die component 22 and a female component 24. The male component 22 includes a cylindrical part 26 of reduced size which is formed with a V-shaped rib 28 extending helically therearound. The female component 24 is formed with a recess 30 and FIG. 12 illustrates a plastic material 32 injected into the space between the die components.

We claim:

1. Insert means for use in forming voids in poured concrete comprising a tubular body of sheet material insertable in poured concrete while the concrete is in a plastic state, upper and lower closure elements detachably secured in top and bottom portions of the tubular body, the inner surface of the tubular body being formed with a helical line of scoring extending between the upper and lower closure elements, said upper closure element being formed integrally with the tubular sheet material and constructed at an upper side thereof with upperwardly extending holder tab means for lifting the upper closure element and also pulling away the tubular structure along the said line of scoring to leave a void in hardened concrete.

2. The invention of claim 1 in which the holder tab consists of a relatively thin sheet material which extends angularly upwardly forming an outer edge of the top closure element and denotes a vertical centering edge which coincides with the vertical central axis of the body to constitute a centering reference point.

3. The invention of claim 2 in which the closure means at the bottom portion of the tubular body includes a retaining cap attached thereto and the bottom of the tubular body is formed with an annular rib around which the attaching retaining cap is engaged.

4. The invention of claim 1 in which the tubular body is of a tapered configuration decreasing in size as it extends upwardly.

5. The invention of claim 1 in which the insert means comprises a plurality of the tubular bodies arranged in nested relationship and respective holder tabs being operable to maintain upper closure portions of the nested tubular bodies in spaced apart relation.

6. An insert for forming a void in poured concrete comprising a tubular body of sheet material tapered with decreasing diameter toward an upper end thereof and a detachable lower closure cap adapted to fit over a lower end of the tubular body, the tubular body being scored along a helical line along its height and having an integral upper closure, the upper closure having a tab extending upwardly therefrom, adapted to be gripped and pulled to tear the tubular body along the score lines to remove both the upper closure and the tubular body from the concrete, the tab having a vertical edge which coincides with the vertical central axis of the tubular body.

* * * * *